April 5, 1966 A. STRICKLER 3,244,608
COULOMETRIC REAGENT GENERATOR
Filed Oct. 9, 1961
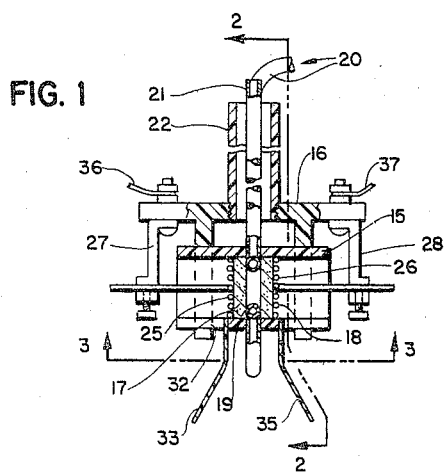
FIG. 1
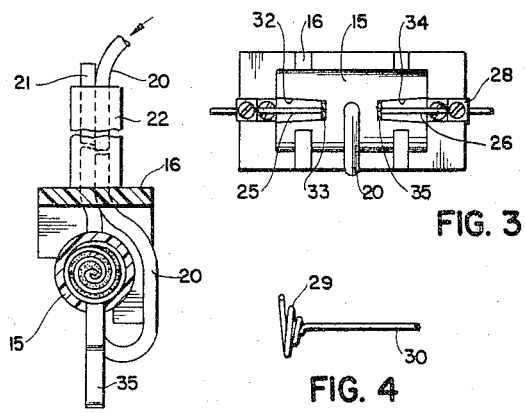
FIG. 2    FIG. 3
FIG. 4
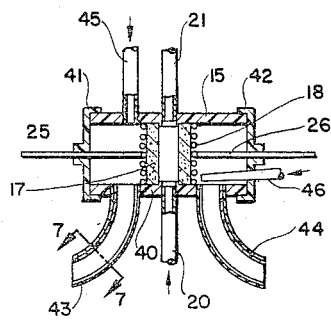
FIG. 6
FIG. 7
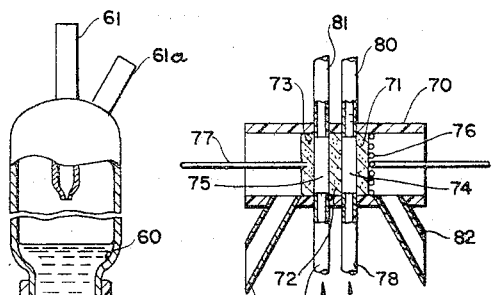
FIG. 8    FIG. 9
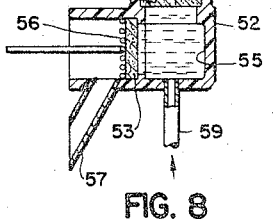
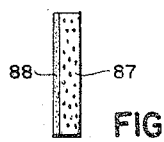
FIG. 5
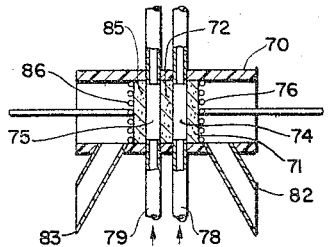
FIG. 10
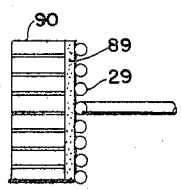
FIG. 11
INVENTOR
ALLEN STRICKLER
BY Robert M. Taylor, Jr.
ATTORNEY

United States Patent Office 3,244,608
Patented Apr. 5, 1966

3,244,608
COULOMETRIC REAGENT GENERATOR
Allen Strickler, Fullerton, Calif., assignor to Beckman Instruments, Inc., a corporation of California
Filed Oct. 9, 1961, Ser. No. 143,658
7 Claims. (Cl. 204—195)

This invention relates to coulometric titrations and more particularly to a reagent generator for use in external coulometric titrations.

Coulometric titrations utilize the known principle that the rate of generation of reagent or titrant produced by the electrolysis of a suitable electrolyte is directly proportional to the electric current involved in the electrolysis. These titrations may be performed internally, i.e., by passing an electric current between a pair of electrodes immersed in the sample medium to be titrated, or externally, i.e., by passing an electric current through an electrolyte contained in a cell remote from the titration vessel and then transferring the reagent formed by the electrolysis to the solution to be titrated. The latter type of titration has been found to be more satisfactory in operation as the direct immersion of a pair of electrodes in the titration vessel often leads to undesirable chemical interferences and electrode contamination.

It is therefore an object of the present invention to provide a coulometric reagent generator which is simple in design and construction; easily assembled and disassembled for cleaning and maintenance, and accurate and reliable in operation.

A further object is to provide a reagent generator which may be a single ended structure with a single output or a double ended structure with two outputs. A further object is to provide a generator having a single output which may utilize one or two porous diaphragms. A still further object is to provide a generator which may utilize a plurality of electrolytes and two or more porous diaphragms to provide appropriate electrolyte spaces.

A further object is to provide a reagent generator including means for directing a stream of supplementary liquid to the exterior of at least one of the electrodes for controlling the rate of flow of reagent away from the electrode and minimizing bubble hang-up on the electrode. A particular object is to provide a reagent generator structure having certain portions formed of highly wettable materials for minimum fluid flow impedance and optimally smooth flow.

The invention also comprises novel details of construction and novel combinations and arrangements of parts, which will more fully appear in the course of the following description. The drawing merely shows and the description merely describes preferred embodiments of the present invention which are given by way of illustration or example.

In the drawing:

FIG. 1 is a sectional view of a preferred form of the coulometric reagent generator;

FIG. 2 is a sectional view taken along the line 2—2 of FIG. 1;

FIG. 3 is a sectional view taken along the line 3—3 of FIG. 1;

FIG. 4 is a side view of an electrode structure for use in the embodiment of FIG. 1;

FIG. 5 is an enlarged sectional view of a porous diaphragm for use in the embodiment of FIG. 1;

FIG. 6 is a sectional view of an alternative form of the generator;

FIG. 7 is an enlarged sectional view taken along the line 7—7 of FIG. 6;

FIGS. 8, 9 and 10 are sectional views of other alternative forms of the generator of the invention; and FIG. 11 is a sectional view of an alternative form of porous diaphragm for use in the present invention.

Referring now to the embodiment of FIGS. 1–3, a tubular housing or case 15 is carried in a cradle 16. Porous diaphragms 17, 18 are carried within the case 15 and are spaced apart to provide an electrolyte space therebetween. In the embodiment shown in FIG. 1, the diaphragms are spaced by a coil 19 of platinum wire which is formed into a loop around the inner surface of the case 15. The coil 19 should be made of a material which is inert in the electrolyte used in the generator as the coil takes no part in the reaction and is electrically passive, merely serving as a spacer for the diaphragms while permitting fluid flow therethrough.

An electrolyte feed line 20 and a standpipe line 21 pass through a support tube 22 fixed to the cradle 16, with the lines communicating with the lower and upper surfaces respectively of the electrolyte space. Electrolyte may be fed to the electrolyte space by any means but it is preferred to fill the electrolyte space from the bottom and to utilize a standpipe which is also partially filled so as to maintain a substantially constant and controllable head of pressure in the electrolyte space. Assuming the electrolyte is fed at a constant rate, any abnormal rise in the liquid level in the standpipe serves as a convenient indication of clogging of the diaphragms and the need for cleaning the cell. Further, the standpipe permits easy discharge of any air in the electrolyte space when the apparatus is started up, such release being difficult when, for example, the electrolyte is fed in from above.

Electrodes 25, 26 are mounted in brackets 27, 28, respectively carried on the cradle 16 for engaging the outer surfaces of the diaphragms 17, 18, respectively. A typical electrode is shown in FIG. 4 and may comprise a spring 29 of helical-conical configuration with an axial conductor 30 for clamping in the brackets 27, 28. The electrodes are normally made of a noble metal such as platinum or the like. When clamped in position in the brackets as shown in FIG. 1, the spring portions of the electrodes are substantially compressed into a plane for contact with the outer surfaces of the diaphragms and for holding the diaphragms in position to provide a relatively rigid and closely controlled electrolyte space.

The electrodes mounted in this fashion are exposed to the atmosphere (either air or another gaseous medium) that surrounds the generating cell. The exposure of the electrodes to the atmosphere substantially enhances the reliability and stability of the generator in that it permits the immediate and unimpeded venting to the atmosphere of any gaseous products of reactions taking place at the electrodes. Without this provision for venting, gases will be entrapped in the delivered reagent in the form of entrained bubbles traversing the reagent delivery tubes. Such entrained bubbles cause an erratic and variable back pressure at the electrodes, resulting in unpredictable back-surge or back-diffusion of the generated reagents behind the electrodes. Reaction may then occur between the generated reagents within the cell so that the electrochemical efficiency of the cell is unimpaired and variable. Direct venting of the bubbles at the electrode also stabilizes the volume-rate of flow of the delivered stream, which otherwise is variable since it is interspersed irregularly with large volumes of gas. Stability of reagent delivery rate is essential in continuous titrations where the apparatus is required to match continuously the rates of delivery of the sample component and the reagent. When pulses occur in the reagent delivery rate, the end point sensing device (e.g. a potentiometric sensor) is subjected to severe transients.

The diaphragms 17, 18 should be porous and electrically inert. Typically the diaphragms are made of a porous glass frit. The diaphragms should have high porosity for minimum electrical resistance across the cell. However, the outer surfaces of the diaphragms underlying the electrodes should not be so coarse as to permit appreciable bubble formation between the electrode and the diaphragm. A preferred form of diaphragm structure is shown in FIG. 5. The major portion 87 of the diaphragm is of coarse grain and high porosity, and the outer surface portion 88 is relatively thin with a fine grain and lower porosity. The porosity of the coarse-grain material, as an example, may be such that a disk 10 mm. in diameter and 3 mm. thick would pass approximately 0.5 ml./sec. of a 1 molar solution of sodium sulfate under a head of 250 mm. of the solution. The flow impedance of the fine grain material could be several-fold as high, but is applied in a thin enough layer so that total flow impedance is not more than about 50–100% higher than that for the coarse material alone.

The use of the relatively rigid porous diaphragms to enclose the electrolyte space in the generator assures known and reproducible pressure of electrolyte across the porous bodies and hence uniform and reproducible fluid flow rates. The electrical resistance of the generator is controllable and reproducible in successive manufactured units. The linear rate of flow of electrolyte through the pores in the diaphragms is reliably rapid at all points on the diaphragms, eliminating any tendency for back diffusion of generated reagent or for stagnant zones of electrolyte.

Another type of diaphragm that may be used in place of that shown in FIG. 5 is shown in FIG. 11. In this diaphragm, a sheet of glass-fiber paper 89 is laid against the outer surface of a coarsely perforated plate 90, for example, of molded plastic. Other porous, flexible sheet-like materials may be used, for example, various foamed plastic materials having interconnecting cell structures. The paper disks are held in contact with the plates by the spring portions 29 of the electrodes and thus are disposable and easily replaced should they become clogged.

Means are provided for flowing liquid away from each of the electrodes. In the preferred structure of FIG. 1, a notch 32 is provided in the case 15 at the base of the electrode 25 and a drain tab 33 is fixed in the notch. A similar notch 34 and drain tab 35 are provided for the electrode 26. The drain tabs preferably are made of highly wettable material, such as porous polyvinyl chloride. The use of a highly wettable drain guide minimizes fluid holdup, as well as hang-up and growth of bubbles along the guide, such bubbles being susceptible of releasing or breaking suddenly and causing transients in the reagent flow rate. Also, it is preferred to make the inner surface of the case 15 of a nonwettable material so that there is no meniscus of liquid encircling the periphery of the electrode to hold up generated reagent or bubbles of appreciable size. Nonwettability may be obtained by making the case of a relatively nonwettable material such as Teflon or polyethylene, or by wiping the inner surface of the case with a hydrophobic lubricant, or by lining the interior of the case with an adhesive tape of nonwetting material.

The brackets 27, 28 are made of electrically conducting material and conductors 36, 37 are provided for connecting the electrodes to a suitable current source.

For acid-base titrations, a suitable electrolyte is 1 molar sodium sulfate solution. Sulfuric acid is generated from this solution at the positive electrode, and sodium hydroxide at the negative electrode. Oxygen and hydrogen gas are incidentally evolved at the positive and negative electrodes respectively. Depending on the nature of the sample, one or the other of the effluent streams is used, while the remaining stream goes to waste. For titration with iodine or bromine as a reagent, 1 molar potassium iodide or bromide, respectively, may be used as the electrolyte, generating free iodine or bromine at the positive electrode, and hydrogen plus potassium hydroxide at the negative electrode, the latter going to waste. For the generation of ferrous ion as a titrant, a solution of ferric sulfate in sulfuric acid may be used, this producing ferrous ion at the negative electrode while at the positive electrode the net effect is release of oxygen. The generation of many other reagents is similarly possible as will be obvious to those skilled in the art.

An alternative embodiment of the reagent generator is shown in FIG. 6, wherein elements identical to those of the embodiment of FIGS. 1–3 are identified by the same reference numerals. The porous diaphragms 17, 18 abut an internal shoulder 40 in the case 15 to define the electrolyte space therebetween. The electrodes 25, 26 are held in caps 41, 42, respectively which close the ends of the case 15. The electrodes are push-fitted in the caps in order to maintain the spring sections of electrodes under compression. Drain tubes 43, 44 are provided in the case 15 at the base of the electrodes 25, 26 respectively. A supplementary fluid line 45 may be provided in the case 15 adjacent the upper edge of the electrode 25. Another supplementary fluid line 46 may be positioned in the cap 42 and directed to the base of the electrode 26.

The supplementary liquid stream may be used with either electrode or with both and may be aimed directly onto the electrode or at the base of the electrode as desired. The supplementary liquid, by rapidly dislodging and washing down bubbles, provides a substantially steady flow of the reagent and also serves to move the reagent away from the electrode at a rapid and steady rate. In part, the supplementary stream minimizes bubbling or foaming at the electrode by reducing surface tension. The increased rate of flow reduces the delay in reagent delivery between the point of generation and the point of use. Increasing the total flow volume also appreciably simplifies the subsequent problem of thoroughly mixing the reagent and sample streams, the latter two streams being ordinarily very small. In general the supplementary streams provide advantages which otherwise would require a wasteful increase in flow rate of either electrolyte or sample or both.

The supplementary liquid should be a material which does not affect the chemical function of the reagent and usually is pure water or additional electrolyte.

The drain tubes 43, 44 preferably have a relatively large diameter so as to prevent filling of the cross section of the tube with liquid during operation and hence preventing entrapment of bubbles in the liquid stream. In its preferred form, the drain tube is constructed to function as a trough with the liquid flowing along a path at the bottom of the tube thus providing for a steady flow with minimum holdup. In the form of FIGS. 6 and 7, the interior of the tube 43 is lined with a second tube 48 of a nonwettable material, with the second tube having a slot 49 to provide a trough along the wettable surface of the tube 43. In this structure, the tube 43 may be of glass or similar material. In an alternative form, a strip of highly wettable material such as a porous plastic film may be laid against or cemented to the bottom edge of the tube 43 to provide the trough, with the tube 43 made of a relatively nonwettable material.

The caps 41 and 42 may be made without openings to totally enclose the spaces on each side of the electrodes. With this form of construction, the gases generated at the electrodes will pass out through the drain tubes and will shield the electrodes and the effluents from the surrounding atmosphere. This arrangement is of particular value when absorption of atmospheric carbon dioxide will adversely affect the reagent generating operation. If desired, a purging gas could be fed into the closed end-chamber where the working electrode is located, either through the line 45 or through another similar line. This gas could be, for example, nitrogen serving to prevent atmospheric carbon dioxide effects, oxidation of the reagent, etc.

An alternative form of the reagent generator is shown in FIG. 8, which unit may be described as a single sided or single ended generator. This type of structure may be used in situations where the chemical products generated at one electrode may be allowed to flow over the other electrode without adverse effect.

The structure of FIG. 8 includes a container 52 having porous diaphragms 53, 54 positioned therein to define an eletcrolyte space 55. An electrode 56 is mounted in contact with the diaphragm 53 and a drain tube 57 provides for fluid flow away from the electrode 56. The desired reagent is produced at the electrode 56 which may be referred to as the working electrode. Another electrode 58 is positioned in contact with the diaphragm 54 and this electrode is the nonworking electrode since the substances produced here are not used in the reagent. A line 59 provides for electrolyte flow into the electrolyte space 55 of the container 52. The container is closed around the nonworking electrode to provide a second electrolyte space 60. Supplementary electrolyte, which may be the same or different from that fed to line 59, may be added continuously to space 60 via feed tube 61 while a side tube 61a continuously vents any gas generated at electrode 58.

In a typical application of the structure of FIG. 8, the electrolyte fed via tube 59 might be potassium iodide solution for the generation of iodine at electrode 56. The reagent solution drains off via tube 57. The supplementary electrolyte fed via tube 61 may in this case be a sulfuric acid solution.

The diaphragm 53 is made with a relatively low flow resistance while the flow resistance of diaphragm 54 is relatively higher. In this way the pressure on the underside of diaphragm 54 is maintained always at a value lower than that on its upper surface, and flow through this diaphragm is always downward. The relatively high flow impedance of diaphragm 54 also minimizes the required flow of supplementary electrolyte. At a given constant rate of feed of supplementary electrolyte, the liquid level in space 60 is established at a constant level determined by the flow impedance of diaphragm 54 and the prevailing pressure in electrolyte space 55.

When an expensive electrolyte such as potassium iodide must be used, the generator of FIG. 8 avoids the waste of up to half the electrolyte by flow over a non-working electrode to a separate external path.

An alternative dual electrolyte system having the advantage of electrolyte economy is shown in two forms in FIGS. 9 and 10. The embodiment of FIG. 6 may also be used in a similar manner. In these structures the gas, if any, generated at the nonworking electrode discharges directly into the air (or ambient gaseous environment) as it does at the working electrode. Electrical resistance fluctuations are thereby much reduced. An advantage also in some cases is that reaction products formed at the nonworking electrode, for example, alkali, are drained to waste and need not flow over the working electrode, there to cause undesirable reaction or interference. Further, as in the embodiment of FIG. 8, all of the working electrolyte, which may be expensive, flows over the working electrode, no part being diverted to waste over a separate path.

First consider the operation of the generator of FIG. 6 as a dual electrolyte generator. The electrode 25 will be the working electrode and the electrode 26 the nonworking electrode. The supplementary line 46 may be omitted. The working electrolyte which is electrolyzed to provide the desired reagent is brought in through the line 45 for flow over the electrode 25. A nonworking or support electrolyte is fed into the electrolyte space between the diaphragms through the line 20. The nonworking electrolyte is electrochemically inactive at the working electrode and serves merely to maintain high electrical conductivity in the generator. In a typical example, the nonworking or support electrolyte between the diaphragms can be an aqueous solution of sodium sulfate. The working electrolyte fed in the line 45 can be an aqueous solution of potassium iodide, with sodium sulfate added for increased conductivity if desired. Iodine is produced from the working electrolyte at the electrode 25. Alkali and hydrogen gas are produced at the electrode 26 where the sodium sulfate solution passes through the diaphragm 18. The alkali flows out the drain tube 44 to waste.

An alternate form of dual electrolyte generator is shown in FIG. 9. A case 70 has porous diaphragms 71, 72, 73 positioned therein defining electrolyte spaces 74 and 75. An electrode 76 is positioned in contact with the diaphragm 71 and a conductor 77 mounted in the diaphragm 73 which also functions as an electrode structure. A support electrolyte is fed into the space 74 through the line 78 and the working electrolyte is fed into the space 75 through a line 79. Standpipes 80, 81 may be used if desired. Drain tubes 82 and 83 are also provided in the case.

The generator of FIG. 9 permits more efficient and economical use of the working electrolyte in that a larger proportion of the active component in the working electrolyte may be converted to useful reagent. The diaphragm 73 which functions as an electrode is made of a conductive material such as porous platinum frit or a plurality of layers of platinum gauze, or the like. The nonworking electrolyte fed into the space 74 can be the sodium sulfate solution previously mentioned. The working electrolyte can be the potassium iodide solution. The porous electrode structure 73 provides a relatively large surface for contacting the electrolyte and also provides for a relatively longer period of contact permitting conversion of a large fraction of the active component of the working electrolyte into the reagent, in this example, into iodine. In the structure of FIG. 9, the diaphragms 71 and 72 are selected to have relatively high flow resistance compared with that of the diaphragm 73 so that the pressure in the space 74 will be higher than that in the space 75. Then electrolyte flow between the spaces will always be from right to left and no working electrolyte will be lost to the nonworking space. The desired pressure differential may also, in whole or part, be obtained by different feed rates via lines 78 and 79, for example by a higher feed rate on line 78.

The combination diaphragm and electrode 73 is ordinarily employed only where no gas is generated at the working electrode, otherwise gas liberated within the electrolyte space and within the diaphragm would adversely affect the operation of the generator. An alternative form of the generator of FIG. 9 is shown in FIG. 10, wherein a nonconducting porous diaphragm 85 and an electrode 86 are substituted for the electrically conducting diaphragm 73. The operation of the generator of FIG. 10 is similar to that of FIG. 9 but is not affected by generation of gas at the electrode 86 as the gas appears only at the electrode surface and may pass out through the end of the case 70.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim:

1. In a coulometric reagent generator, the combination of:
   a first electrically non-conductive porous diaphragm having a first zone of relatively coarse high porosity form and a second zone of relatively fine low porosity form forming its opposed faces;
   a second electrically non-conductive porous diaphragm having a first zone of relatively coarse high porosity form and a second zone of relatively fine low porosity form forming its opposed faces;
means for supporting said diaphragms for defining an electrolyte space between the first zones thereof;
means for delivering an electrolyte to said electrolyte space;
a first electrically conducting electrode;
a second electrically conducting electrode;
means for supporting said first and second electrodes in contact with said second zones of said first and second diaphragms respectively;
and means for flowing liquid away from at least one of said electrodes.

2. In a coulometric reagent generator, the combination of:
a case having a passageway therethrough providing a pair of open ends;
a first electrically non-conductive porous diaphragm having a first zone of relatively coarse high porosity form and a second zone of relatively fine low porosity form forming its opposed faces;
a second electrically non-conductive porous diaphragm having a first zone of relatively coarse high porosity form and a second zone of relatively fine low porosity form forming its opposed faces;
means for supporting said diaphragms in said case for defining an electrolyte space between the first zones thereof;
an electrolyte line coupled to said case at said electrolyte space and extending upward above said space, said line having an open upper end;
means connected to said case for delivering an electrolyte to said electrolyte space adjacent the lower edge thereof for filling said space and at least partially filling said line;
a first electrically conducting electrode;
a second electrically conducting electrode;
means for supporting said first and second electrodes in contact with said second zones of said first and second diaphragms respectively whereby said electrodes are exposed to the atmosphere through said open ends of said case;
and guide means mounted in said case adjacent the lower edge of one of said electrodes for flowing a liquid away from said electrode, said guide means including a trough structure having a relatively wettable zone extending along the bottom thereof.

3. A generator as defined in claim 2 in which means are provided for directing a stream of liquid to said one of said electrodes.

4. In a coulometric reagent generator the combination of:
a case, said case being open to the atmosphere at both ends;
a first electrically non-conductive porous diaphragm having a first zone of relatively coarse high porosity form and a second zone of relatively fine low porosity form forming its opposed faces;
a second electrically non-conductive porous diaphragm having a first zone of relatively coarse high porosity form and a second zone of relatively fine low porosity form forming its opposed faces;
means for supporting said first and second diaphragms in said case for defining an electrolytic space between the first zones thereof;
means for delivering an electrolyte to said electrolyte space;
a first electrically conducting electrode;
a second electrically conducting electrode;
means for supporting said first electrode in said case so that one side of said first electrode contacts the second zone of said first diaphragm and the other side of said first electrode is exposed to the atmosphere;
means for supporting said second electrode in said case so that one side of said second electrode contacts the second zone of said second diaphragm and the other side of said second electrode is exposed to the atmosphere;
means located in the bottom of said case adjacent the lower edges of said electrodes for flowing fluid away from said electrodes.

5. In a coulometric reagent generator, the combination of:
a case having a passageway therethrough providing only one end open for the passage of liquid;
first and second electrically non-conductive porous diaphragms mounted in said case defining a first electrolyte space therebetween and a second enclosed electrolyte space having a means to permit only generated gas to escape between said second diaphragm and said case, said escape means being adapted to prevent the passage of liquid;
a first electrically conducting electrode mounted in contact with said first diaphragm remote from said first electrolyte space;
a second electrically conducting electrode mounted in contact with said second diaphragm in said second electrolyte space;
and means mounted in said case adjacent the lower edge of said first electrode for flowing said liquid away from said first electrode.

6. In a coulometric reagent generator, the combination of:
a first electrically non-conductive porous diaphragm;
a second electrically non-conductive porous diaphragm;
means for supporting said diaphragms for defining a first electrolyte space between the inner faces of said diaphragms;
means for delivering a first electrolyte to said first electrolyte space;
a first electrically conducting electrode structure;
a second electrically conducting electrode structure including a third porous diaphragm;
means for supporting said first electrode structure in contact with the outer face of said first diaphragm;
means for supporting said second electrode structure for defining a second electrode space between said second electrode structure and the outer face of said second diaphragm;
means for delivering a second electrolyte to said second electrolyte space;
means for establishing an electric current through the electrolytes between said electrodes;
and means for flowing liquid away from at least said second electrode structure.

7. In a coulometric reagent generator, the combination of:
a first electrically non-conductive porous diaphragm;
a second electrically non-conductive porous diaphragm;
a third electrically non-conductive porous diaphragm;
means for supporting said diaphragms for defining a first electrolyte space between said first and second diaphragms and a second electrolyte space between said second and third diaphragms;
means for delivering electrolyte to each of said electrolyte spaces;
a first electrically conducting electrode;
a second electrically conducting electrode;
means for supporting said first and second electrodes in contact with the outer faces of said first and third diaphragms respectively;
means for establishing an electric current through the electrolytes between said electrodes;
and means for flowing liquid away from at least one of said electrodes.

(References on following page)

References Cited by the Examiner

UNITED STATES PATENTS

| | | | |
|---|---|---|---|
| 1,182,759 | 5/1916 | Emanuel | 136—86 |
| 2,247,065 | 6/1941 | Pauli et al. | 204—180 |
| 2,307,137 | 1/1943 | Kennedy | 204—195 |
| 2,744,061 | 5/1956 | De Ford et al. | 204—1 |
| 3,032,493 | 5/1962 | Coulson et al. | 204—195 |
| 3,109,788 | 11/1963 | Miller et al. | 204—129 |

FOREIGN PATENTS 521,773    5/1940    Great Britain.

OTHER REFERENCES

Lingane: "Electroanalytical Chemistry," 2nd edition, 1958, pages 525 and 526.

JOHN H. MACK, *Primary Examiner.*
JOSEPH REBOLD, WINSTON A. DOUGLAS,
*Examiners.*